(12) United States Patent
Elmer

(10) Patent No.: US 10,078,512 B2
(45) Date of Patent: Sep. 18, 2018

(54) PROCESSING DENORMAL NUMBERS IN FMA HARDWARE

(71) Applicant: VIA ALLIANCE SEMICONDUCTOR CO., LTD., Shanghai (CN)

(72) Inventor: Thomas Elmer, Austin, TX (US)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 120 days.

(21) Appl. No.: 15/283,606

(22) Filed: Oct. 3, 2016

(65) Prior Publication Data
US 2018/0095749 A1 Apr. 5, 2018

(51) Int. Cl.
G06F 9/30 (2018.01)
G06F 7/485 (2006.01)
(Continued)

(52) U.S. Cl.
CPC ............ *G06F 9/3001* (2013.01); *G06F 7/485* (2013.01); *G06F 7/4876* (2013.01);
(Continued)

(58) Field of Classification Search
CPC ........ G06F 7/482; G06F 7/485; G06F 7/4876; G06F 7/5443
See application file for complete search history.

(56) References Cited

U.S. PATENT DOCUMENTS 4,187,539 A 2/1980 Eaton
4,974,198 A 11/1990 Ishii
(Continued)

FOREIGN PATENT DOCUMENTS

EP 0681236 11/1995
JP H10207693 A 8/1998
(Continued)

OTHER PUBLICATIONS

European Search Report dated Jan. 18, 2016, issued in application No. 17153226.0-1221.
(Continued)

*Primary Examiner* — Chuong D Ngo
(74) *Attorney, Agent, or Firm* — McClure, Qualey & Rodack, LLP

(57) ABSTRACT

A microprocessor includes FMA execution logic that determines whether to accumulate an accumulator operand C to the partial products of multiplier and multiplicand operands A and B in the partial product adder or in a second accumulation stage. The logic calculates an exponent delta of Aexp+Bexp−Cexp and determines the number of leading zeroes in C, if C is denormal. The microprocessor accumulates C with the partial products of A and B when the accumulation of C to the product of A and B could result in mass cancellation, when ExpDelta is greater than or equal to −K (where K is related to a width of a datapath in the partial product adder), and when a C is denormal and its number of leading zeroes plus K exceeds −ExpDelta. The strategic use of resources in the partial product adder and second accumulation stage reduces latency.

11 Claims, 9 Drawing Sheets

(51) Int. Cl.
  *G06F 7/487* (2006.01)
  *G06F 7/499* (2006.01)
  *G06F 9/38* (2018.01)
(52) U.S. Cl.
  CPC ...... *G06F 7/49915* (2013.01); *G06F 7/49952* (2013.01); *G06F 9/30014* (2013.01); *G06F 9/3861* (2013.01)

(56) References Cited

U.S. PATENT DOCUMENTS

| | | |
|---|---|---|
| 5,347,481 A | 9/1994 | Williams |
| 5,375,078 A | 12/1994 | Hrusecky et al. |
| 5,880,983 A | 3/1999 | Elliott et al. |
| 5,880,984 A | 3/1999 | Burchfiel et al. |
| 5,990,351 A | 11/1999 | Cabre et al. |
| 6,094,668 A | 7/2000 | Oberman |
| 6,233,672 B1 | 5/2001 | Lynch |
| 6,779,013 B2 | 8/2004 | Pangal |
| 6,947,962 B2 | 9/2005 | Hoskote et al. |
| 7,080,111 B2 | 7/2006 | Pangal et al. |
| 7,117,372 B1 | 10/2006 | Trimberger et al. |
| 7,401,107 B2 | 7/2008 | Lutz et al. |
| 7,689,641 B2 | 3/2010 | Abel et al. |
| 7,917,568 B2 | 3/2011 | Henry et al. |
| 8,046,399 B1 | 10/2011 | Inaganti et al. |
| 8,386,755 B2 | 2/2013 | Elmer et al. |
| 8,577,948 B2 | 11/2013 | Srinivasan et al. |
| 8,671,129 B2 | 3/2014 | Brooks et al. |
| 2004/0098439 A1 | 5/2004 | Bass et al. |
| 2004/0267857 A1 | 12/2004 | Abel et al. |
| 2005/0125476 A1 | 6/2005 | Symes et al. |
| 2006/0136543 A1 | 6/2006 | Lutz et al. |
| 2006/0184601 A1 | 8/2006 | Trong et al. |
| 2007/0038693 A1 | 2/2007 | Jacobi et al. |
| 2007/0266071 A1 | 11/2007 | Dockser et al. |
| 2008/0016321 A1 | 1/2008 | Pennock et al. |
| 2008/0215659 A1 | 9/2008 | Cowlishaw et al. |
| 2008/0256150 A1 | 10/2008 | Quinnell et al. |
| 2008/0256161 A1 | 10/2008 | Quinnell et al. |
| 2009/0248769 A1 | 10/2009 | Chua |
| 2010/0268920 A1 | 10/2010 | Brooks et al. |
| 2011/0029760 A1 | 2/2011 | Elmer et al. |
| 2011/0072066 A1 | 3/2011 | Lutz et al. |
| 2012/0072703 A1 | 3/2012 | Srinivasan et al. |
| 2012/0079251 A1* | 3/2012 | Gradstein ........... G06F 9/30014 712/221 |
| 2012/0215823 A1 | 8/2012 | Lutz |
| 2014/0006467 A1 | 1/2014 | Samudrala et al. |
| 2014/0122555 A1 | 5/2014 | Hickmann et al. |
| 2014/0188963 A1* | 7/2014 | Tsen ........................ G06F 7/483 708/209 |
| 2014/0188966 A1 | 7/2014 | Galal et al. |
| 2016/0004504 A1 | 1/2016 | Elmer |
| 2016/0004505 A1 | 1/2016 | Elmer |
| 2016/0004506 A1 | 1/2016 | Elmer |
| 2016/0004507 A1 | 1/2016 | Elmer |
| 2016/0004508 A1 | 1/2016 | Elmer |
| 2016/0004509 A1 | 1/2016 | Elmer |
| 2016/0004665 A1 | 1/2016 | Elmer |
| 2017/0097824 A1 | 4/2017 | Elmer et al. |

FOREIGN PATENT DOCUMENTS

| | | |
|---|---|---|
| WO | WO2007094047 | 8/2007 |
| WO | WO2012040632 | 3/2012 |

OTHER PUBLICATIONS

Lutz, D.; "Fused Multiply-Add Microarchitecture Comprising Separate Early-Normalizing Multiply and Add Pipelines," 2011 20th IEEE Symposium on Computer Arithmetic; Jul. 2011; pp. 123-128.

Hokenek, Erdem et al. "Second-Generation RISC Floating Point with Multiply-Add Fused" IEEE Journal of Solid-State Circuits, vol. 25, No. 5, Oct. 1990; pp. 1207-1213.

Lang, Tomas et al. "Floating-Point Multiply-Add-Fused with Reduced Latency" IEEE Transactions on Computers, vol. 53, No. 8, Aug. 2004; pp. 988-1003.

Bruguera, Javier D. et al. "Floating-Point Fused Multiply-Add: Reduced Lateny for Floating-Point Addition" Computer Arithmetic, 2005; pp. 42-51.

Vangal, Sriram R. et al. "A 6.2-GFlops Floating-Point Multiply-Accumulator With Conditional Normalization" IEEE Journal of Solid-State Circuits, vol. 41, No. 10, Oct. 2006. pp. 2314-2323.

Galal, Sameh et al. "Energy Efficient Floating-Point Unit Design", IEEE Transactions on Computers, vol. 60, No. 7, Jul. 2011; pp. 913-922.

Srinivasan, Suresh et al. "Split-path Fused Floating Point Multiply Accumulate (FPMAC)", 2013 IEEE 21st Symposium on Computer Arithmetic; pp. 17-24.

Srinivasan, Suresh et al. "Split-path Fused Floating Point Multiply Accumulate (FPMAC)" 2014 Symposium on Computer Arithmetic. Austin TX, (slides from www.arithsymposium.org) pp. 1-19.

Quach, Nhon et al. "Suggestions for Implementing a Fast IEEE Multiply-Add-Fused Instruction" (Stanford) Technical Report CSL-TR-91-483 Jul. 1991; pp. 1-17.

Seidel, Peter-Michael. "Multiple Path IEEE Floating-Point Fused Multiply-Add", IEEE 2004; pp. 1359-1362.

Huang, Libo et al. "A New Architecture for Multiple-Precision Floating-Point Multiply-Add Fused Unit Design" 18th IEEE Symposium on Computer Arithmetic. 2007 IEEE pp. 1-8.

Paidimarri, Arun et al. "FPGA Implementation of a Single-Precision Floating-Point Multiply-Accumulator with Single-Cycle Accumulation" 2009 17th IEEE Symposium on Field Programmable Custom Computing Machines. 2009 IEEE. pp. 267-270.

Walla, Abd El Aziz Ibrahim. "Binary Floating Point Fused Multiply Add Unit" Thesis Submitted to Cairo University, Giza, Egypt, 2012 (retr from Google). pp. 1-100.

Quinnell, Eric Charles. "Floating-Point Fused Multiply-Add Architectures" Dissertation Presented to Univ Texas at Austin, May 2007. pp. 1-150.

Author Unknown. "AMD Athlon™ Processor Floating Point Capability", AMD White Paper Aug 28, 2000.

Cornea, Marius et al. "Intel® Itanium® Floating-Point Architecture" ACM, Jun. 6, 2003. pp. 1-9.

Gerwig, G. et al. "The IBM eServer z990 Floating-Point Unit", IBM Journal Res & Dev. vol. 48, No. 3/4. May, Jul. 2004. pp. 311-322.

Wait, C.D., "IBM PowerPC 440 FPU with complex-arithmetic extensions" IBM Journal Res & Dev. vol. 49, No. 2/3. Mar., May 2005. Pages 249-254.

Chatterjee, S. et al. "Design and exploitation of a high-performance SIMD floating-point unit for Blue Gene/L" IBM Journal Res & Dev. vol. 49, No. 2/3. Mar., May 2005. pp. 377-391.

Seidel, Peter-Michael. "Multiple Path IEEE Floating-Point Fused Multiply-Add." Proc 46th Int. IEEE MWSCAS, 2003 pp. 1-4.

Wikipedia "CPU Cache" Downloaded from http://en.wikipedia.org/wiki/Cache_memory on Jan. 11, 2017. pp. 1-11.

Knowles, Simon. "Arithmetic Processor Design for the T9000 Transputer" SPIE vol. 1566 Advanced Signal Processing Algorithms, Architectures, and Implementations II. 1991 pp. 230-243.

Schmookler, M. et al. "Leading Zero Anticipation and Detection—A Comparison of Methods" IEEE Xplore. Downloaded Apr. 21, 2009 pp. 7-12.

Schwarz, E et al. "FPU Implementations with Denormalized Numbers" IEEE Transactions on Computers, vol. 54, No. 7, Jul. 2005. pp. 825-836.

Schwarz, E. et al. "Hardware Implementations of Denormalized Numbers" Proceeding of the 16th IEEE Symposium on Computer Arithmetic. 2003 IEEE. pp. 1-9.

Trong, S. et al. "P6 Binary Floating-Point Unit" IEEE Xplore Conference Paper. Jul. 2007. pp. 1-10.

* cited by examiner

ExpDelta = -2

ExpDelta = -5; accumulator will not fit in datapath (having 2m+1 width) unless accumulator is a denormal having at least 3 leading zeroes

PROCESSING DENORMAL NUMBERS IN FMA HARDWARE

RELATED APPLICATIONS

This application is related to U.S. patent application Ser. No. 14/748,817 ("the '817 application"), filed Jun. 24, 2015, and entitled "Non-Atomic Split-Path Fused Multiply-Accumulate," and to U.S. patent application Ser. No. 15/202,351 ("the '351 application"), filed Jul. 5, 2016, and entitled "Chained Split Execution of Fused Compound Arithmetic Operations," both of which are incorporated herein by reference.

FIELD OF INVENTION

This invention relates to microprocessor designs for performing arithmetic operations, and more particularly, fused FMA operations.

BACKGROUND

This background is presented to provide a meaningful context for the disclosure. This background may include descriptions of problems and subject matter that do not constitute prior art, or which include elements that are not part of the prior art. Therefore, nothing in this background should be regarded as prior art unless it is self-evidently and verifiably prior art.

Floating point multiply accumulate (FMA) logic is a critical component of modern computer processors. In an FMA operation, execution logic performs an operation representable by $\pm A^* \pm B \pm C$, where A, B and C are each floating point numbers representing a multiplier, a multiplicand, and an accumulator, respectively.

One of the goals of FMA design is to reduce critical timing paths. This has led some FMA designers to analyze different categories of FMA calculations and design logic optimized for certain types of FMA calculations. For example, US 2012/072703 to Srinivasan describes a monolithic multiply accumulate unit with near and far datapaths for accumulating the accumulator operand. The near path handles cases in which a difference between the product of the multiplier exponents and the accumulator exponent—hereinafter referred to as ExpDelta—is within a threshold range (−2, −1, 0, 1). The far path handles the other cases.

The '817 application describes logic in which the accumulator is accumulated along with the partial products for a far larger set of operand inputs than Srinivasan. In a nutshell, the accumulator can be injected into the partial product adder if the accumulator magnitude is small enough, relative to the product magnitude, that it does not require an exponent-aligned left-shift beyond what the datapath can accommodate. In a case in which the partial product adder datapath is equal to 1 plus 2 times the significand width, for example, the accumulator is accumulated with the partial products in cases where ExpDelta $\geq -1$. If the operation would result in an effective subtraction, the accumulation is also done in the partial product adder for cases in which ExpDelta=−2. But for other cases, the accumulator is accumulated separately, after a normalized, nonredundant sum has been generated of the partial products. As used herein, ExpDelta refers to the sum of the multiplicand and multiplier exponents minus the accumulator exponent.

With both of these references, the path or accumulation stage is determined based on the operand exponent values. But with denormal operands, the true exponent value (i.e., the value that the exponent would be if the denormal value were normalized to an infinite precision exponent) is not immediately known. Consequently, an ExpDelta calculation on one more denormal operands may not accurately reflect the potential that an accumulator operand can be aligned within the partial product adder. Moreover, denormal inputs can create complications in the design of a split-unit FMA, because we don't know the true magnitude of the denormal accumulator. It may, with respect to an underflow product, be smaller or larger than the underflow product. This introduces challenges in aligning it properly for accumulation.

The typical prior art response to the problem of denormal inputs is to prenormalize the inputs. This is accomplished by having the FMA logic count the number of leading zeroes for each operand on the front end of an FMA unit. Unfortunately, this initial leading zero determination becomes a part of the critical path, slowing down the execution speed of the FMA logic. An additional detriment is that prenormalization can contribute latency to the instruction. Some designs consume several processor cycles to accommodate prenormalization. This can create situations in which an instruction needs to be replayed, and any instruction dependent on it has to be delayed.

SUMMARY

This summary is provided to introduce the subject matter that is further described below in the Detailed Description and Drawings. The subject matter set forth below may include elements and aspects and particular calculations or ways of doing things that are not essential to the invention or to some embodiments of the invention. Accordingly, this Summary should not be used to limit the scope of the claimed subject matter.

In one aspect, a method is provided for processing a denormal accumulator in an FMA calculation in a microprocessor. The microprocessor determines an exponent difference between the sum of the multiplier and multiplicand exponents and the accumulator operand exponent. The microprocessor also determines the number of leading zeroes in the denormal accumulator operand significand. When the number of leading zeroes plus a nonnegative integer constant exceeds the absolute value of the exponent difference, the accumulator operand is left-shifted and added to the multiplier and multiplicand partial products.

In one implementation, the nonnegative integer constant is the maximum left-shift amount that the accumulator operand significand could be left shifted and still fit into a partial product summation data path.

In another aspect, the microprocessor subtracts the number of leading zeroes from the exponent difference—after determining both—to yield an adjusted exponent delta value. The microprocessor also determines whether a first condition, concerning the value of the adjusted exponent delta value is satisfied and whether the accumulation would result in an effective subtraction. If the first condition is satisfied, the microprocessor accumulates the accumulator with the partial products of the multiplier and multiplicand within a partial product adder. If the first condition is not satisfied, then the microprocessor first calculates the product with the partial product adder and then accumulates the product in a second accumulation operation.

In yet another aspect, the microprocessor aligns the most significant bit (MSB) of the largest partial product to a designated bit position of the partial product adder datapath, determines a constant number K representing a number of bit positions in the partial product adder datapath that are more significant than the designated bit position, and determines whether the adjusted exponent delta value is at least −K, or, in the case of an effective subtraction, at least −K−1.

In a still further aspect, a microprocessor is provided that includes FMA execution logic, including a partial product adder. The partial product adder is configured to accumulate C with the partial products of A and B for a subset of input operand values in which the absolute value of C is smaller than or nearly as small as the absolute value of the product of A and B. The FMA execution logic is configured to handle a special case in which C is denormal by determining an exponent difference value and the number of leading zeroes in the denormal C. When the sum of the number of leading zeroes plus a nonnegative integer constant exceeds the exponent difference, then the microprocessor left-shifts C to produce a value that is accumulated to the partial products of A and B within the partial product adder.

In still another aspect, a microprocessor is provided that accumulates C in a first stage or second stage for first and second subsets of input operand values, respectively. For the first subset of input operand values, C is accumulated to the partial products of A and B before FMA execution logic generates a normalized, nonredundant sum. For the second subset of input operand values, C is accumulated to a normalized, nonredundant sum of the partial products of A and B. The FMA execution logic is also configured to handle a special case in which the accumulator is denormal and a product of the multiplier and multiplicand operands would result in an underflow. It handles this special case by left-shifting C and accumulating it in the first stage if the number of leading zeroes plus a nonnegative integer constant related to the datapath width in the first stage exceeds the sum of the exponents of A and B minus the exponent of C.

In an additional aspect, a microprocessor is provided that calculates an exponent delta and determines the number of leading zeroes in a denormal accumulator C. The microprocessor also accumulates C with the partial products of A and B before generating a normalized, nonredundant sum for a plurality of cases, including: cases of normal operands in which ExpDelta is greater than or equal to −K, where K is related to a width of a datapath in the partial product adder, cases of ExpDelta for which accumulation of C to the product of A and B could result in mass cancellation, and cases involving a denormal C in which the number of leading zeroes plus K exceeds −ExpDelta.

BRIEF DESCRIPTION OF THE DRAWINGS

These and other objects, features, and advantages of the present invention will become better understood with regard to the following description, and accompanying drawings.

DETAILED DESCRIPTION

Figure 1:
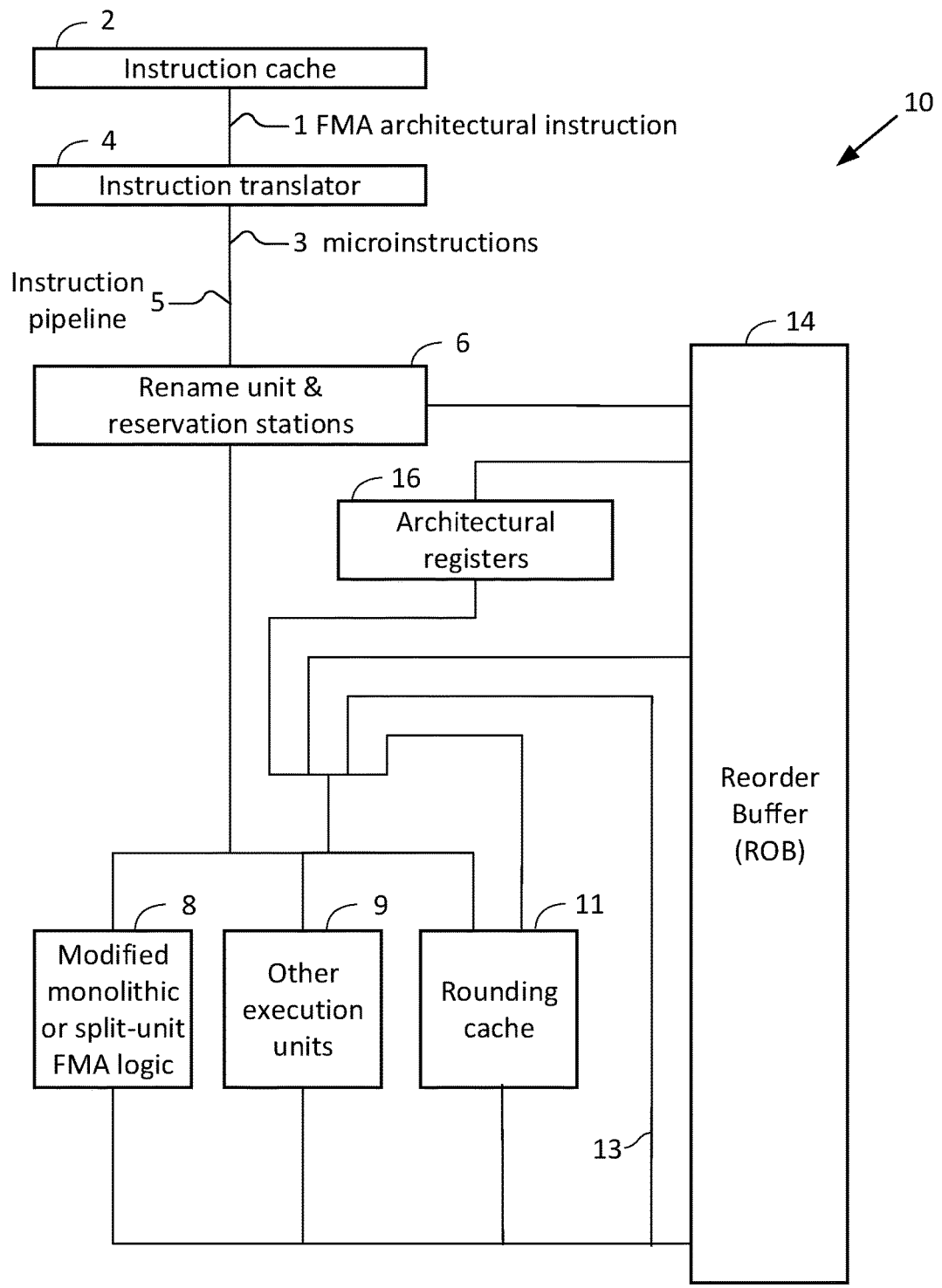
FIG. 1 is a simplified diagram of one embodiment of a pipelined microprocessor core having execution units, including split-stage FMA logic in accordance with the invention.

Exemplary and illustrative embodiments of the invention are described below. In the interest of clarity, not all features of an actual implementation are described in this specification, for those skilled in the art will appreciate that in the development of any such actual embodiment, numerous implementation specific decisions are made to achieve specific goals, such as compliance with system-related and business related constraints, which vary from one implementation to another. Furthermore, it will be appreciated that such a development effort might be complex and time-consuming, but would nevertheless be a routine undertaking for those of ordinary skill in the art having the benefit of this disclosure. Various modifications to the preferred embodiment will be apparent to those skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present invention will now be described with reference to the attached figures. Various structures, systems, and devices are schematically depicted in the drawings for purposes of explanation only and so as to not obscure the present invention with details that are well known to those skilled in the art. Nevertheless, the attached drawings are included to describe and explain illustrative examples of the present invention.

Microprocessor Overview

Referring now to FIG. 1, a block diagram illustrating a microprocessor 10 is shown. The microprocessor 10 has a plurality of execution units, including monolithic or split-unit logic 8 configured to execute FMA calculations. In one embodiment, FMA calculations are performed by a modified multiplier and a modified adder, as described in the '817 application. In another embodiment, FMA calculations are performed by a monolithic FMA execution unit that has been modified to incorporate first and second stages to perform the accumulation of the accumulator for respective first and second subsets of FMA inputs.

The microprocessor 10 also includes an instruction cache 2, an instruction translator and/or microcode ROM 4, a rename unit and reservation stations 6, (optionally) a rounding cache 11 (for embodiments using split-unit FMA logic), architectural registers 16, and a reorder buffer 14 (including rename registers). Other functional units (not shown) may include a microcode unit; branch predictors; a memory subsystem including a cache memory hierarchy (e.g., level-1 data cache, level 2 cache), memory order buffer, and memory management unit; data prefetch units; and a bus interface unit, among others. The microprocessor 10 has an out-of-order execution microarchitecture in that instructions may be issued for execution out of program order. More specifically, microinstructions—into which architectural instructions (or macroinstructions) are translated or transformed—may be issued for execution out of program order. The program order of the microinstructions is the same as the program order of the respective architectural instructions from which they were translated or transformed. The microprocessor 10 also has a superscalar microarchitecture in that it is capable of issuing multiple instructions per clock cycle to the execution units for execution. In one implementation, the microprocessor 10 provides for execution of instructions in a manner compatible with the x86 instruction set architecture.

Architectural FMA instructions 1 progress along the microprocessor's instruction pipeline 5 from a fetch unit to the execution units. The architectural instructions 1 are fetched from the instruction cache 2, which caches architectural instructions 1 retrieved from system memory. The instruction translator and/or microcode ROM 4 translates or transforms the architectural instructions 1 fetched from the instruction cache 2 into microinstructions 3 of a microinstruction set of the microarchitecture of the microprocessor 10. The execution units 8, 9 execute the microinstructions. The microinstructions 3 into which an architectural instruction 1 is translated or transformed implement the architectural instruction 1. The rename unit 6 receives and allocates entries in the ROB 14 for microinstructions 3 in program order, updates the microinstruction 3 with the index of the allocated ROB entry, dispatches each microinstruction 3 to the appropriate reservation station 6 associated with the execution unit that will execute the microinstruction 3, and performs register renaming and dependency generation for the microinstructions 3.

FMA Logic

Figure 2:
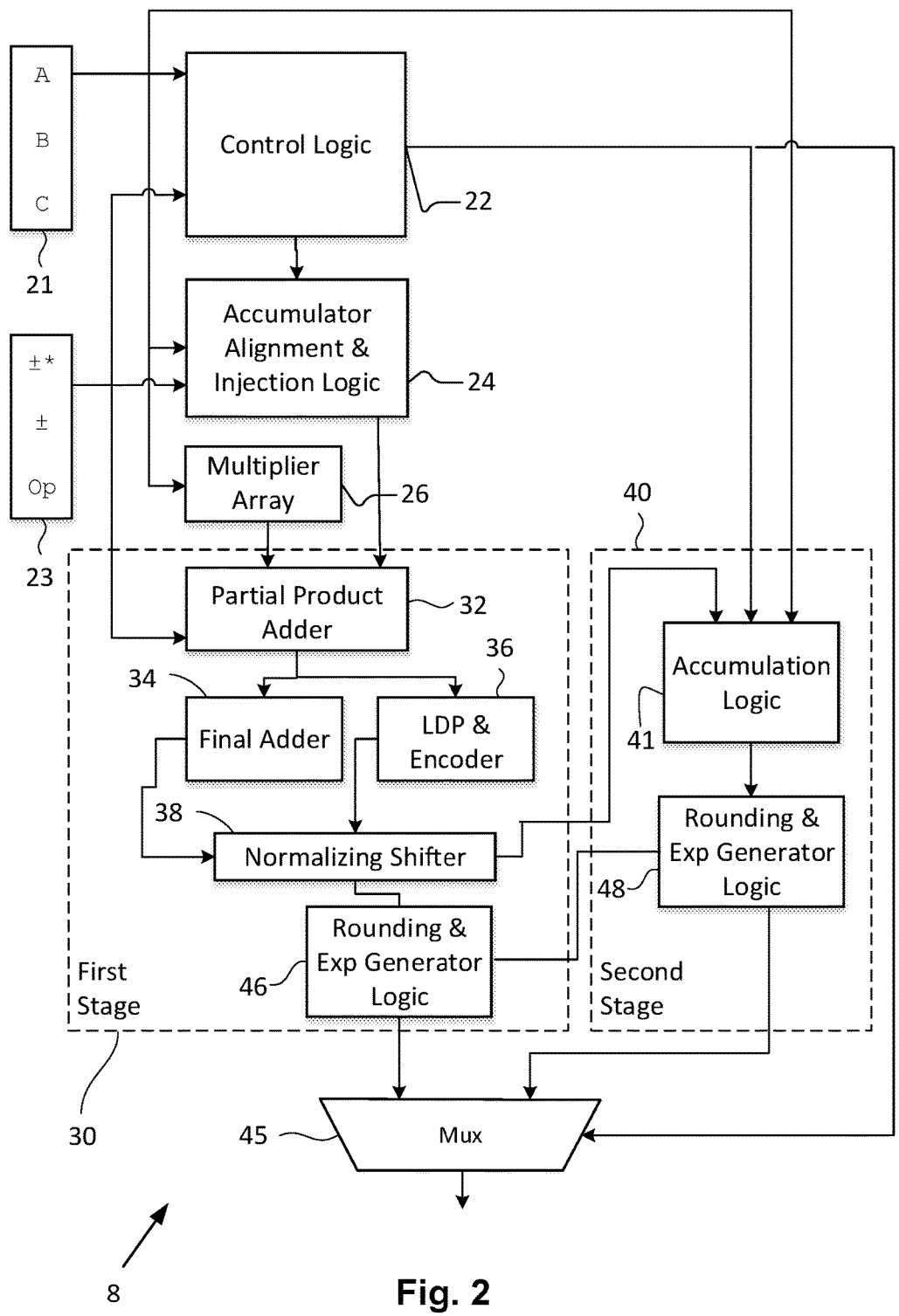
FIG. 2 is a block diagram of one embodiment of the FMA logic of FIG. 1, in which the accumulator is accumulated in first and second stages for first and second subsets, respectively, of FMA inputs.

FIG. 2 is a simplified block diagram illustrating one embodiment of the FMA logic 8 of FIG. 1. The top left of the diagram illustrates operand inputs 21, including a floating-point multiplier A, a floating-point multiplicand B, and a floating point accumulator C. One or more or all of these are received by control logic 22, an accumulator alignment & injection logic 24, a multiplier array 26, and by second stage accumulation logic 41. Right below block 21, the diagram illustrates the signs and add/subtract operator 23 associated with the FMA calculation.

The FMA logic 8 is subdivided into first and second stages 30 and 40. The first stage 30 is predominantly focused on multiplication of operands A and B. The first stage 30 also accumulates operand C to the product of A and B for a first subset of operand inputs. The second stage 40 is predominantly focused on the accumulation of C to the product of A and B for a second subset of operand inputs.

The FMA logic 8 is also configured to execute instructions that merely involve multiplication and instructions that merely involve addition or subtraction. In particular, the first stage 30 is configured to not only perform a portion of an FMA operation, but also to execute standard floating point multiply instructions that merely involve a multiplier and multiplicand. Likewise, the second stage 40 is also configured to execute standard floating point add and subtract instructions that involve no multiplication at all.

In one embodiment, the first and second stages 30 and 40 are incorporated into a monolithic execution unit. In another embodiment resembling those of the '817 and '351 applications, the first stage is incorporated into a modified multiplier unit and the second stage is incorporated into a modified adder unit, both of which (like any execution unit generally) have input operand ports supplied by an operand bus and an output port linked to a ROB 14.

The control logic 22 receives the exponents of operands A, B and C, as well as the sign and operator 23 indicators, and determines an ExpDelta value. The ExpDelta value refers to the sum of the exponents of the multiplier and multiplicand operands minus the exponent of the accumulator operand. This value is explained further below. To summarize, this value provides an indication of how far right-shifted or left-shifted an exponent-aligned accumulator would be with respect to the product of the multiplier and multiplicand. (Exponent-aligned refers to the left- or right-shifting of operands so that all of the operands share the same exponent value.) This value is useful not only for determining whether the accumulator can fit within the partial product summation datapath, but also for aligning the accumulator within the product summation datapath 92. Consistent with this ExpDelta calculation, the control logic 22 selects whether the accumulator will be accumulated in the partial product adder 32 (PPA) or the second stage accumulation logic 41.

The accumulator alignment & injection logic 24 receives the ExpDelta value from the control logic 22, operand C, and the sign and operator indicators 23. The logic 24 uses this information to conditionally align and inject operand C into the PPA 32. If the control logic 22 selects the second stage accumulation logic 41 to accumulate C, then—as discussed with reference to mux 74 in FIG. 3—the accumulator alignment & injection logic 24 injects a value of zero into the PPA 32.

The multiplier array 26 receives operands A and B and multiplies the operands to produce a plurality of partial products, which it sends to the PPA 32.

The PPA 32 receives not only the partial products and, conditionally, the exponent-aligned operand C, but also the sign and operator indicators 23. With this information, the PPA 32 generates sum and carry vectors that, when added together, produce the final sum.

The final adder 34 adds the sum and carry vectors received from the PPA 32, producing a nonredundant prenormalized sum.

A leading digit predictor and encoder 36 also receives the sum and carry vectors, producing a shift value to normalize the nonredundant prenormalized sum.

The normalizing shifter 38 receives the nonredundant prenormalized sum and normalizes it using the shift value. The normalizing shifter 38 produces an intermediate value.

For FMA operations, the first stage rounding and exponent generator logic 46 is provided to generate rounding bits—which the '817 application also refers to as calculation control bits—to signal whether accumulation is needed in the second stage and guide the final rounding performed by the second stage rounding & exponent generation logic 48. For these operations, the first stage rounding and exponent generator logic 46 receives the intermediate value produced by the normalizing shifter 38 and generates rounding bits without rounding the output of the normalizing shifter 38.

The first stage rounding and exponent generator logic 46 is also configured to complete standard floating point multiply (which is distinguished from multiply-accumulate) operations. For these standard floating point multiply operations, the first stage rounding and exponent generator logic 46 receives the intermediate value produced by the normalizing shifter 38, performs full and final rounding, and generates a final value.

As shown in the second stage 40, the accumulation logic 41 is configured via a special-purpose bus or network to receive the intermediate value generated by the first stage 30. The accumulation logic 41 accumulates C to this intermediate value and produces a pre-rounded output. As noted before, the second stage 40 is also configured to completely perform standard floating point adds and subtracts (also distinguished from FMA calculations) using values received from two input operand ports.

The second stage rounding and exponent generation logic 48 receives the pre-rounded output from the second stage accumulation logic 41, performs full and final rounding, and generates a final value.

As illustrated at the bottom of the diagram, a multiplexer 45 receives the final values from the first and second stages 30, 40, and—based upon a selection value received from the control logic 22—selects one of the values as the output of the FMA logic 8.

Relation of ExpDelta to the PPA

Before describing one embodiment of circuitry within the FMA logic 8 for processing denormal accumulator inputs, it is instructive to describe the relationship of different values of ExpDelta to the partial product datapath 92.

If the PPA datapath 92 (FIGS. 7 & 8) is wide enough—at least about three times the width of the significand of the largest supported operand—it is possible to accumulate C within the PPA 32. This approach, which is used by some in the prior art, requires a much larger PPA 32 as well as a much larger alignment shifter and final adder 34. Unfortunately, the bigger the shifter and the bigger the final adder 34, the greater the delay. This, in turn, makes it more difficult for the FMA logic to meet the cycle time goals of the processor.

In ways that are not obvious, splitting the accumulation of partial products and C into first and second stages—if done strategically—creates a potential of faster operation. It allows for smaller alignment shifters and datapaths in both the first and second stages that result in greater speed advantages, overall, than are lost by requiring two accumulation and/or partial rounding operations. It also allows—when done in conjunction with the generation of rounding indicators, as the '817 application discusses—the FMA operation to be performed in two steps by separate specially modified multiplier and adder execution units. Further, it allows the specially modified multiplier to perform standard multiply operations, and the specially modified adder to perform standard adding operations, far more efficiently than a conventional FMA execution unit.

The benefits noted above depend on a strategic split of the accumulation of partial products and C into first and second stages. One aspect of that strategy is to accumulate C in the PPA 32, rather than in the accumulation logic 41, for a subset of FMA operand values. Another aspect of that strategy is to determine the boundaries of that subset.

For example, there is an advantage to accumulating C within the PPA 32 in all cases of potential mass cancellation, which spans ExpDelta values of −2 to +1. This is because in cases of mass cancellation, the resulting value may need to be normalized before it is rounded. When C is accumulated within the PPA 32, the extensive normalizing shifter 38 in the first stage 30 can perform the normalization. This avoids the need of using (or in a monolithic FMA unit of providing) an equally extensive normalizing shifter in the second stage.

There is also an advantage to accumulating C within the PPA 32 in all cases in which the accumulator is smaller than the product. In particular, this avoids the necessity of providing an accumulation datapath in the accumulation logic 41 that is at least two times the significand width of the maximum supported operand.

This is explained by the fact that in a standard accumulation of numbers, generally only a single operand contributes to determination of the round and sticky bits for rounding, provided that the result precision is the same as the input operands' precision. If so, then a datapath that is only one significand in width, plus one, is adequate (together with sticky collection logic) to perform the accumulation. Any less significant bits are accounted for in the calculation of the sticky and round bits.

But in a FMA calculation, the product of A and B produces an intermediate result that is two times the significand width. If C is less in absolute magnitude than the product, then both the product and C may contribute to the round and sticky bits. Accordingly, for such values of C, a wider datapath (at least two times the significand width) is necessary to accumulate the product to C. Accommodating such accumulations in the accumulation logic 41 would require a widening of the datapath therein that would contribute to the latency of the calculation. That, in turn, would not only delay FMA calculations but also standard addition and subtraction calculations performed using the FMA logic 8.

For the reasons set forth above, the '817 application pioneered the strategy of handling all mass cancellation and relatively small C cases in the partial product adder 32, while using the accumulation logic of a modified adder to accumulate C to the product of A and B in all of the remaining cases, while keeping the PPA datapath width 93 to a minimum. As alluded to above, one resulting advantage was that circuitry (such as a normalizer) that would otherwise be needed within a modified adder (or adding stage) could be unused in—or in circuits that handle only FMAs eliminated from—the modified adder, because all cases in which normalization would be needed before rounding are handled within the modified multiplier (or multiplying stage). This potentially simplifies the circuitry of the modified adder (or adding stage). At the same time, keeping the PPA datapath width 93 to a minimum minimizes the complexity of the PPA datapath 92 and, significantly, the timing delay, because a smaller alignment is required.

When implementing the strategy above, the subset of values of A, B, and C (for normal operands) for which C can be accumulated in the PPA 32 depends on the width of the PPA and the value ExpDelta. ExpDelta represents the difference between the sum of the multiplier and multiplicand exponents $A_{exp}$ and $B_{exp}$ and the accumulator exponent $C_{exp}$. Because the exponents are biased, 1 times the bias value is subtracted (i.e., $A_{exp}+B_{exp}-C_{exp}-1\times bias$).

In accordance with the product of powers property of exponents, when multiplying two numbers of the same base, one adds the exponents. Therefore, the multiplication of A times B will yield an exponent equal to $A_{exp}+B_{exp}$. It may seem strange, after adding the multiplier and multiplicand exponents, that the accumulator exponent $C_{exp}$ is subtracted from this sum. But the subtraction of $C_{exp}$ serves a different purpose than the addition of $A_{exp}+B_{exp}$, which was made to indicate the absolute magnitude of the product of A and B. The subtraction of $C_{exp}$ reveals the exponential difference between the absolute magnitude of the product of A and B and the absolute magnitude of C. This exponential difference equals the number of bits the accumulator C needs to be left or right-shifted to align the accumulator exponent with the product exponent.

Accordingly, ExpDelta—together with knowledge of the width of the datapath of the PPA 32—reveals whether the accumulator C, after being shifted, can be accumulated with the partial products in the PPA 32. The problem of aligning an accumulator with the partial products in a limited-width datapath will become clearer in connection with Tables 1 through 3, below, as well as in connection with FIGS. 7-10.

To illustrate the problem, three simplified examples are presented involving an FMA operation (with no Booth recoding) on IEEE 754 64-bit floating point binary numbers. These examples assume a PPA datapath width 93 equal to 2 times the significand width plus one (i.e., 2×53+1=107 bits, labeled bit 0 to bit 106), in which the MSB of the largest magnitude partial product of normalized multiplier and multiplicand inputs is aligned to fill the third most significant bit column of the datapath 92. In order to maintain the simplicity of the illustrations, these examples assume no Booth recoding is used. The principles illustrated, however, are also applicable when Booth recoding is used.

Example 1

A*B+C, where $A=1.1\times2^{-510}$; $B=1.1\times2^{-510}$; and $C=1.101\times2^{-1021}$. The sum of the exponents of A and B is −1020, which is greater (by 1) than the −1021 exponent of C. Accordingly, ExpDelta=−1020−(−1021)=+1. The MSB of the largest partial product, corresponding to the exponent −1020, occupies bit column 104. Because A*B is greater than C, C's MSB can be aligned in bit column 103 of the datapath 92, and C summed in the PPA 32. Indeed, as shown in the table below, C would still fit in the PPA 32 even if ExpDelta were −1 (i.e., the MSB of C in the second MSB column) or, in the case of an effective subtraction, −2 (i.e., the MSB of C in the MSB bit column). In the case of an effective subtraction, there would be no risk that such an accumulation would overflow to the left of the MSB bit column (i.e., bit position 106).

TABLE 1

Relative positions of partial products and accumulator in datapath

| | Datapath Bit Position: | | | | | | |
|---|---|---|---|---|---|---|---|
| | 106 | 105 | 104 | 103 | 102 | 101 | 100 | 99 . . . 00 |
| Partial Product n − 1: | | | 1 | 1 | 0 | 0 | 0 . . . 0 |
| Partial Product n: | | 1 | 1 | 0 | 0 | 0 | 0 . . . 0 |
| Accumulator: | | | 1 | 1 | 0 | 1 | 0 . . . 0 |

The ExpDelta analysis, however, is complicated by the case of a denormal accumulator. Because the significand of a denormal accumulator has one or more leading zeroes, a denormal accumulator exponent $C_{exp}$ value does not represent the normalized exponent of the accumulator C. In fact, the normalized exponent would be $C_{exp}$−NLZ, where NLZ is the number of leading zeroes in the accumulator C. The leading zeroes effectively give the accumulator C some extra room—via left shifting—to be aligned with the partial products in the PPA datapath 92.

As a practical matter, this extra opportunity (or need, as the case may be) to align the accumulator C only presents itself in cases in which the product produces an underflow, where the underflow product is larger than, or at least very close in magnitude to, the denormal accumulator. Examples 2 and 3 below illustrate situations involving a denormal accumulator—one in which the denormal accumulator can be aligned, and another in which the denormal accumulator cannot be aligned, for accumulation in the PPA datapath 92.

Example 2

A*B+C, where $A=1.1\times2^{-512}$; $B=1.1\times2^{-513}$; and $C=0.0001101\times2^{-1022}$ (denormalized). Because A*B is greater than C, C can be aligned to the right of the products of A and B in the datapath and summed in the PPA 32. However, this is not apparent by comparing only the exponents. The sum of the exponents of A and B is −1025, which is less (by 3) than the −1022 exponent of denormalized C. The MSB of the largest partial product is always aligned to occupy bit column 104, so this time bit column 104 corresponds to the exponent −1025. Without accounting for the leading zeroes, it would appear that C would need to be aligned with its MSB in bit position 107, corresponding to an exponent of −1022. Because in this example, the PPA 32 does not provide a bit position 107, it would appear, based on the examination of the exponents alone, that accumulation of C cannot be done in the PPA 32. However, C's true value, when normalized, is $1.101\times2^{-1026}$. The exponent −1026 is smaller than the sum of the exponents of A and B, so C can be aligned in the datapath 92.

TABLE 2

Relative positions of partial products and accumulator in datapath

| | Datapath Bit Position: | | | | | | |
|---|---|---|---|---|---|---|---|
| | 106 | 105 | 104 | 103 | 102 | 101 | 100 | 99 . . . 00 |
| Partial Product n − 1: | | | | 1 | 1 | 0 | 0 | 0 |
| Partial Product n: | | | 1 | 1 | 0 | 0 | 0 | 0 |
| Accumulator: | 0 | 0 | 0 | 1 | 1 | 0 | 1 | 0 |

Example 3

A*B+C, where $A=1.1\times2^{-515}$; $B=1.1\times2^{-515}$; and $C=0.0001101\times2^{-1022}$ (denormalized). In this example, A*B is significantly less than C, so C cannot be accumulated with the products of A and B in the datapath 92. The sum of the exponents of A and B is −1030, which is less (by 8) than the −1022 exponent of denormalized C. Even when accounting for the leading zeroes, or finding the normalized exponent of C (−1026), it becomes apparent that C would need to be aligned too far to the left of the partial products to fit within the PPA 32. Therefore, accumulation of C therefore cannot be done in the PPA 32.

TABLE 3

Accumulator does not fit in datapath

| | | | | Datapath Bit Position: | | | | | |
|---|---|---|---|---|---|---|---|---|---|
| | N/A | 106 | 105 | 104 | 103 | 102 | 101 | 100 | 99 . . . 00 |
| Partial Product n − 1: | | | | | 1 | 1 | 0 | 1 | 0 |
| Partial Product n: | | | | 1 | 1 | 0 | 1 | 0 | 0 |
| Accumulator: | 1 | 1 | 0 | 1 | 0 | 0 | 0 | 0 | 0 |

However, if the PPA datapath width 93 were two bit positions wider than that designated for this example—at a cost of increased latency in the PPA 32 and the final adder 34 and with no corresponding decrease in the latency of the accumulation logic 41—then C could still be accumulated in the PPA 32.

The examples above illustrate limited circumstances in which denormal accumulators can be accumulated in the PPA 32, even in cases in which the product underflows, provided that the underflow value is larger, equal, or very nearly as big as the denormal accumulator.

FIGS. 7-10 include further illustrations of denormal accumulator accumulation in a PPA 32. These illustrations provide a simpler example of a datapath 92 configured to accommodate only 32-bit IEEE 754 floating-point numbers, which provides 23 bits (plus one implied bit) for the significand.

Figure 7:
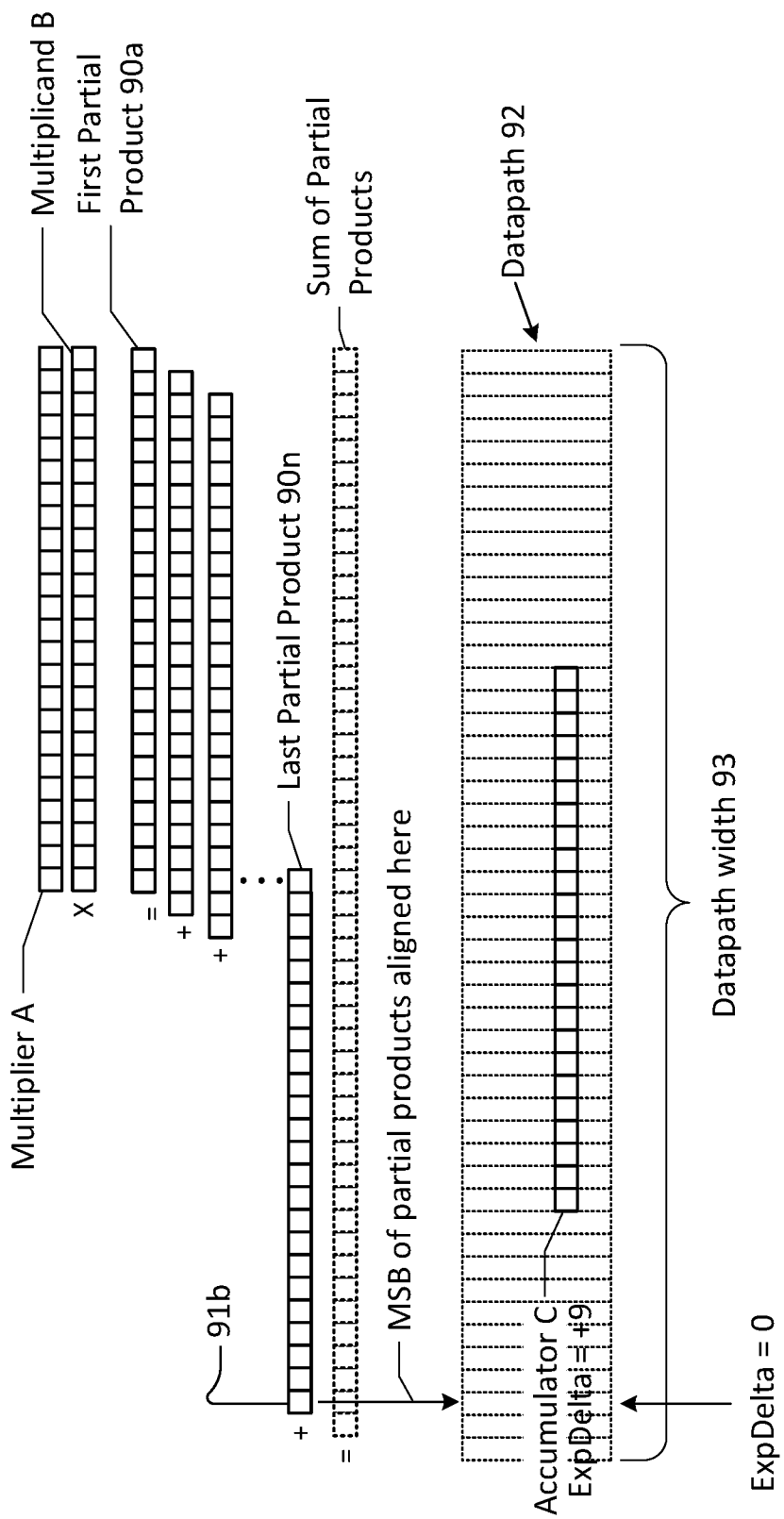
FIG. 7 is a simplified diagram illustrating an alignment of partial products, with no Booth recoding, with an accumulator in a partial product adder datapath in a FMA calculation in which ExpDelta equals +9.

As shown in FIG. 7, the partial product calculation of the significands of floating point numbers produces partial products 90a-90n, each offset from the previous partial product (if any) by one bit, if no Booth recoding is used. The MSB of the most significant partial product 91b corresponds to an ExpDelta equal to 0, or alternatively, to the initially calculated product exponent, and the product exponent is determined separately.

The very nature of a binary multiplication means that the partial product datapath 92 has to be a minimum of 2m−1 bits just to accommodate the partial products, the MSB of which would have an exponent equal to the sum of the multiplier and multiplicand exponents, $A_{exp}+B_{exp}$. Once the partial products are added, generating sum and carry vectors, an extra bit is needed (making a total of 2m bits, the MSB of which corresponds to the exponent $A_{exp}+B_{exp}+1$). Here, the PPA 32 provides 2m+1 bits in order to accommodate accumulation of all potential mass cancellation cases that may require normalization before rounding, including effective subtractions where ExpDelta=−2.

FIG. 7 also illustrates an accumulator C having an exponent that is nine binary orders of magnitude smaller than the largest partial product (i.e., ExpDelta=+9). Because C fits within this partial product datapath 92, it is accumulated in the datapath 92.

Figure 8:
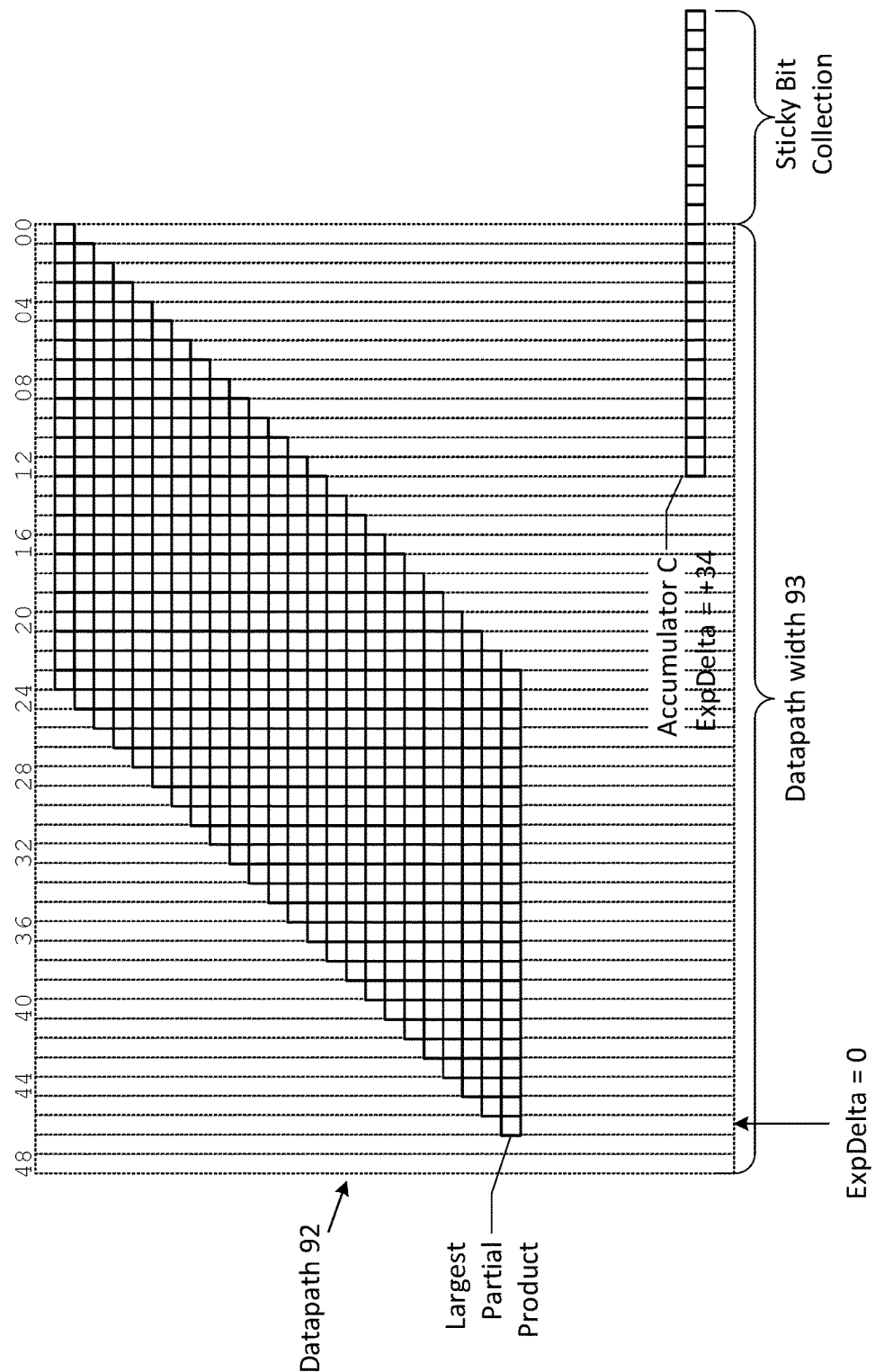
FIG. 8 is a simplified diagram illustrating an alignment of partial products, with no Booth recoding, with an accumulator in a partial product adder datapath in a FMA calculation in which ExpDelta equals +34.

FIG. 8 illustrates 24 partial products of the multiplication of two IEEE 754 32-bit floating point numbers that are arranged within a 49-bit-wide datapath 92, again using no Booth recode for simplicity. An accumulator C having an ExpDelta of +34 is exponent-aligned with the partial products so that it can be accumulated in the datapath 92. The accumulator's most significant bits are accumulated in the datapath 92. The remainder are funneled into a sticky bit collection circuit for use in rounding the result of the FMA calculation.

Figure 9:
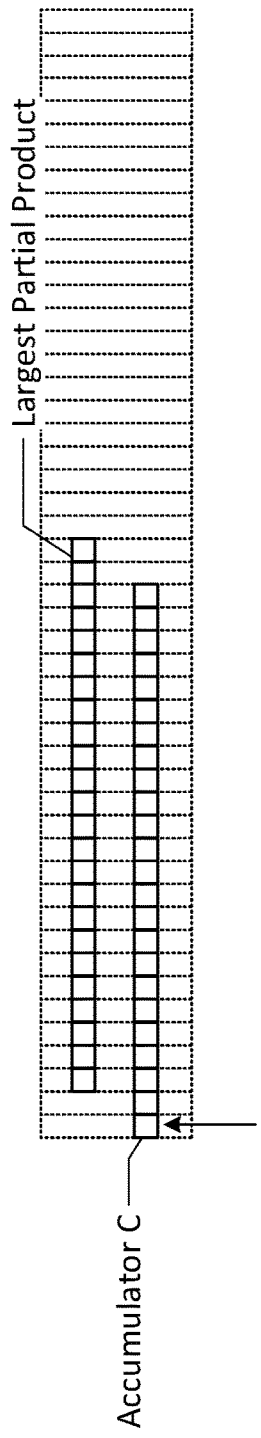
FIG. 9 is a simplified diagram illustrating an alignment of partial products, with no Booth recoding, with an accumulator in a partial product adder datapath in a FMA calculation that is an effective subtraction and in which ExpDelta equals −1.

FIG. 9 illustrates a calculation in which the accumulator C is slightly larger in magnitude than the largest partial product (ExpDelta=−2). Assuming that the calculation is an effective subtraction, C can be accumulated in the PPA 32.

Figure 10:
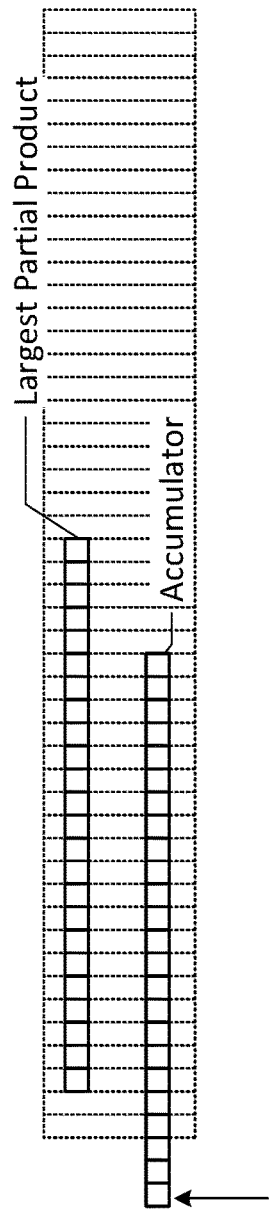
FIG. 10 is a diagram illustrating a failed alignment of partial products with an accumulator in a partial product adder datapath in a FMA calculation in which ExpDelta equals −4.

FIG. 10, by contrast, illustrates a calculation in which the accumulator C is significantly larger than the largest partial product (ExpDelta=−5). If C is a normal number, then the datapath 92 is not wide enough to accommodate accumulation of C in the PPA 32. In a preferred embodiment, C will have to instead be accumulated after the partial products have been added together, producing (at least) carry and sum vectors and possibly also a nonredundant sum vector. However, if C is a denormal number, and at least the top three most significant bits are zero, then C can be accumulated in the datapath 92, provided that logic (such as described herein) is supplied to detect this condition.

Figure 6:
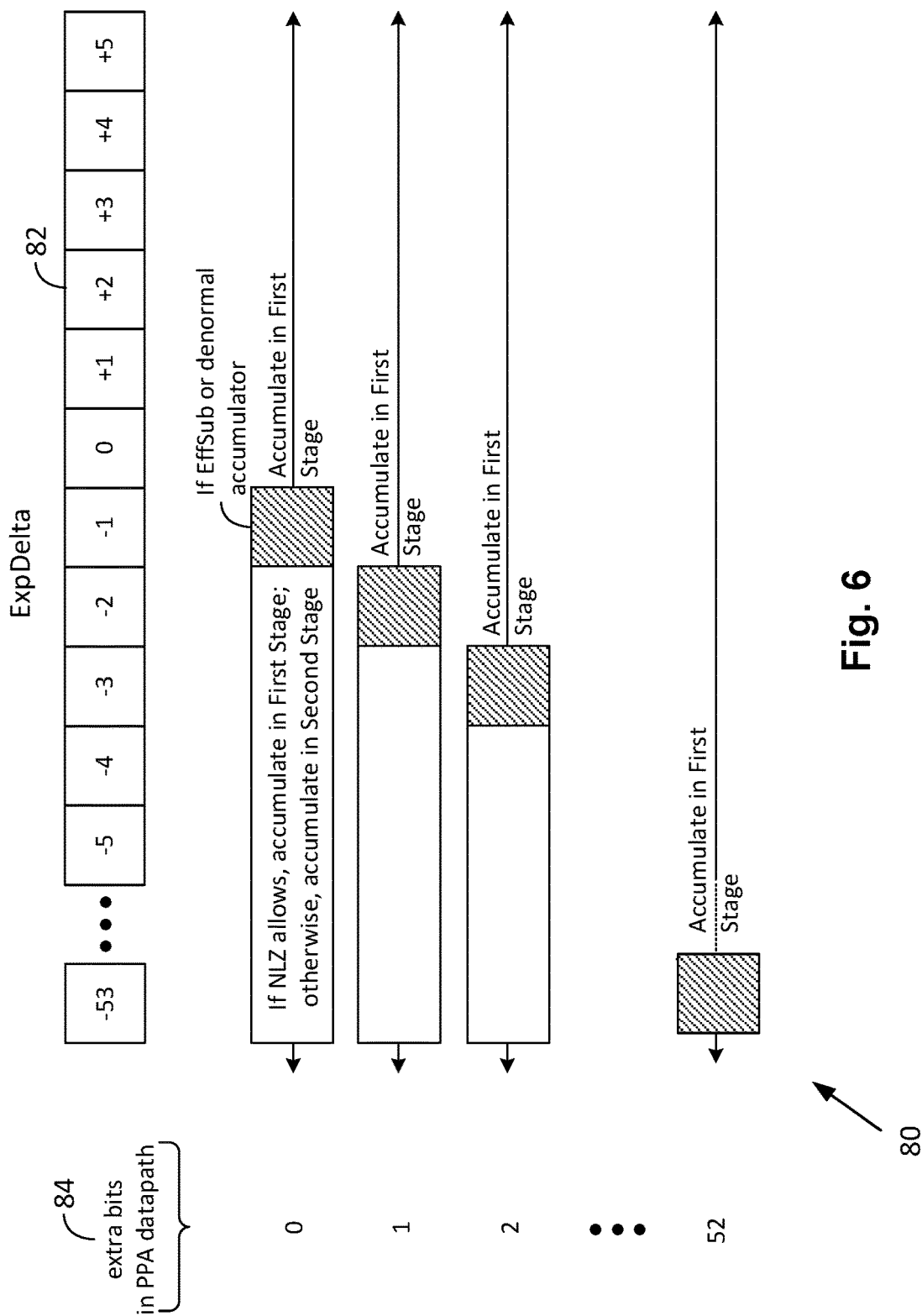
FIG. 6 is a diagram illustrating an exemplary and non-limiting relationship between datapath width and the ability of an accumulator to be aligned within the datapath for accumulation with the partial products.

As can be seen above, the determination of whether C can be accumulated in a PPA datapath 92 is a function of ExpDelta, the number of extra bits in the PPA datapath 92 and the number of leading zeroes if C is denormal. It is also, as indicated in the '817 application, a function of whether the FMA calculation would constitute an effective subtraction. This relationship is illustrated in FIG. 6. FIG. 6 illustrates a range of subsets of input operands for which accumulation of operand C can be done in the PPA 32, depending on, among other things, the width of the datapath 92. For input operands that do not belong in the applicable subset, accumulation of operand C is done in the second stage accumulation logic 41.

Denormal Processing

The foregoing treatment illustrates circumstances under which denormal accumulators can be accumulated in the PPA 32. Attention is now turned to logic for identifying those circumstances and processing denormal accumulators for accumulation within the PPA 32.

Figure 3:
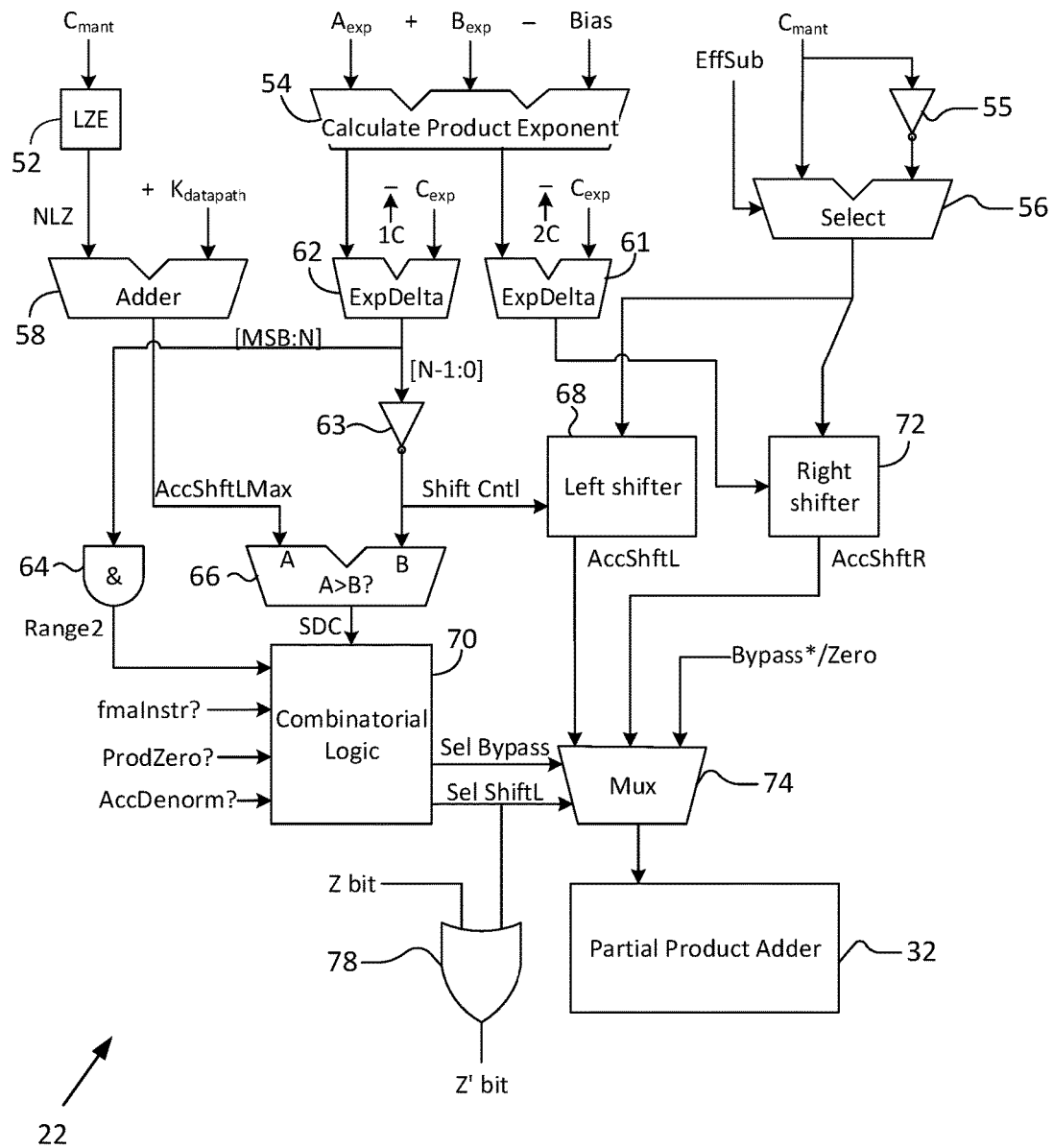
FIG. 3 is a block diagram of one embodiment of control logic for processing denormal numbers in the first stage of the FMA logic of FIG. 2.

FIG. 3 is a simplified block diagram of one embodiment of control logic 22 for processing denormal numbers in the first stage of the FMA logic of FIG. 2. Control logic 22 examines the exponents of the input operands, determines whether the accumulator C is denormal, and determines whether the accumulator C, whether or not denormal, will be accumulated in the PPA 32.

The top of the diagram illustrates a summation block 54 that calculates the product exponent, which is the sum of the multiplier and multiplicand exponents, i.e., $A_{exp}+B_{exp}$. Initially, this value is doubly biased. Pursuant to IEEE 754, floating point numbers are biased so that a "1" value for the exponent actually represents the minimum representable exponent value, which is −1022 for a 64-bit floating point number. Adding two biased exponents generates a value that has two times the bias. Therefore, the summation block 54 includes logic to subtract one times the bias, producing a consistently biased product exponent value.

In one particular implementation, two pieces of logic—subtraction blocks 61 and 62—are provided that each subtract the accumulator exponent to produce an ExpDelta value. Subtraction block 61 computes ExpDelta using 2's complement subtraction. Subtraction block 62 computes ExpDelta using 1's complement subtraction. The result produced by subtraction block 61 is fed into the right shifter 72. The N least significant bits of the result of the subtraction block 62 is inverted by inverter 63 and fed into the left shifter 68 and a comparison circuit 66.

The reason that two subtraction blocks 61 and 62 are provided is so that each of two cases of accumulation—one involving positive or nearly positive ExpDeltas, and the other involving significantly negative ExpDeltas—can take advantage of the relative efficiencies of 1's and 2's complement subtraction. 1's complement subtraction is relatively more efficient for negative results than for positive results, because a correction is needed for positive results. Negative results need only be inverted to determine the absolute value—which is the purpose of inverter 63. 2's complement subtraction, by contrast, is relatively more efficient for positive results than for negative results. Because the PPA 32 will ultimately only receive results of right shifter 72 for positive ExpDelta's, and results of a left shifter for negative ExpDelta's, it is advantageous to feed the left and right shifters 68 and 72 with ExpDelta values generated by the 1's complement and 2's complement subtracters 62 and 61, respectively.

It should be noted that only the least significant N bits of the unbiased ExpDelta value need be received and inverted by inverter 63. The value of N is set to the maximum amount—rounded up to the nearest power of 2—the accumulator C can be left shifted and still have its values fit within the datapath 92. For example, a 64-bit IEEE number has a 53-bit significand. If the accumulator C were shifted more than 53 bits (plus any additional bit columns provided by the datapath) to the left of the multiplier-times-multiplicand product, then the accumulator C could not fit within the datapath 92. The number 64—i.e., $2^6$—is the first power of two following 53. Therefore, in this example, N is preferably set to 6.

There are a set of denormal accumulator inputs that are not accumulated in the PPA 32. This includes but is not limited to inputs where ExpDelta is −55 or less for double precision numbers. These are inputs for which the magnitude of the accumulator C is considerably larger than the magnitude of the product. For such inputs, there is no first stage accumulation. Instead, the product is calculated, round and sticky bits are computed, and the foregoing is delivered to the second stage. The second stage responds to the underflow product input by de-normalizing it (i.e., right shifting it), which correctly aligns it with the denormal accumulator input. So instead of trying in the first stage to left shift the denormal accumulator input—where the datapath 92 is not wide enough to accommodate the shift—the second stage shifts the underflow product to the right by an amount equal to ExpDelta. The second stage is adequately wide to take the computed product of the first stage, right shift it by ExpDelta, and complete the computation, including rounding.

The other bits [MSB:N] of the unbiased ExpDelta value are shunted to the range finder 64. The range finder 64 is a combinatorial circuit—for example, a logical AND of all of the MSBs of ExpDelta—that detects whether ExpDelta is a very large negative number or not (for example, −64 or less). If it is, this indicates that the denormal accumulator is still too large relative to the underflow product to be accumulated in the PPA datapath 92. In the situation where ExpDelta is, say, between −55 and −63 in an implementation where the FMA logic 87 can only handle double precision numbers, the comparator 66 (discussed further below) prevents accumulations of C in the datapath.

While the summation block 54 is calculating the product exponent, a leading zero encoder 52 calculates the number of leading zeroes NLZ in the accumulator significand. Adder 58 adds NLZ to a constant $K_{datapath}$. $K_{datapath}$ represents the number of bit columns provided in the PPA datapath 92 to the left of the bit column that is aligned to the MSB of the product of A and B. In a preferred embodiment, $K_{datapath}$ equals 1. The output of the adder, AccShftLMax, represents the maximum accumulator left shift amount that the datapath can accommodate.

Comparator 66 compares AccShftLMax with the output of inverter 63, which is equal—for negative ExpDeltas—to the absolute value of ExpDelta. If AccShftLMax is greater than ExpDelta, then a special-denorm-case (SDC) signal is sent to a combinatorial logic block 70, whose logic will be discussed later. If true, the SDC signal indicates an accumulator exponent whose magnitude is greater than an underflow product exponent, as indicated by the negative ExpDelta, but not greater enough in magnitude to prevent C from being accumulated in the PPA datapath 92. If no SDC signal is generated, then C cannot be accumulated in the PPA datapath 92.

The control logic 22, in parallel with and at generally the same time as determining whether a denormal accumulator can be accumulated in the PPA datapath 92, also provisionally left-shifts and right-shifts $C_{mant}$ in preparation for potentially accumulating $C_{mant}$ in the PPA datapath 92. First, an inverter inverts $C_{mant}$ in case the operation is determined to be an effective subtraction. Next, an EffSub signal (which is described in the '817 application), acts as a selection signal on mux 56 to select between inverted and un-inverted values of $C_{mant}$. The selected accumulator value is received by both the left shifter 68 and the right shifter 72, generating left-shifted and right-shifted values AccShftL and AccShftR, respectively.

The left-shifted and right-shifted values AccShftL and AccShftR and a bypass or zero value, explained below, are fed into a mux 74, a selected value of which is then injected into the PPA 32. The mux 74 receives two selection signals from the combinatorial logic 70, a bypass select signal and a ShiftL select signal.

While this has only secondary significance to the present invention, the control logic 22 also shows an OR circuit that produces a Z' bit (essentially, a stage selection bit) from the Z bit described in '817 application. The Z' bit indicates whether accumulation of C is performed within the PPA datapath 92 or not. Applied to the illustrated circuit of the '817 application, the Z' bit, rather than the Z bit, would be communicated along with other calculation control indicators to the '817 application's modified adder.

Figure 4:
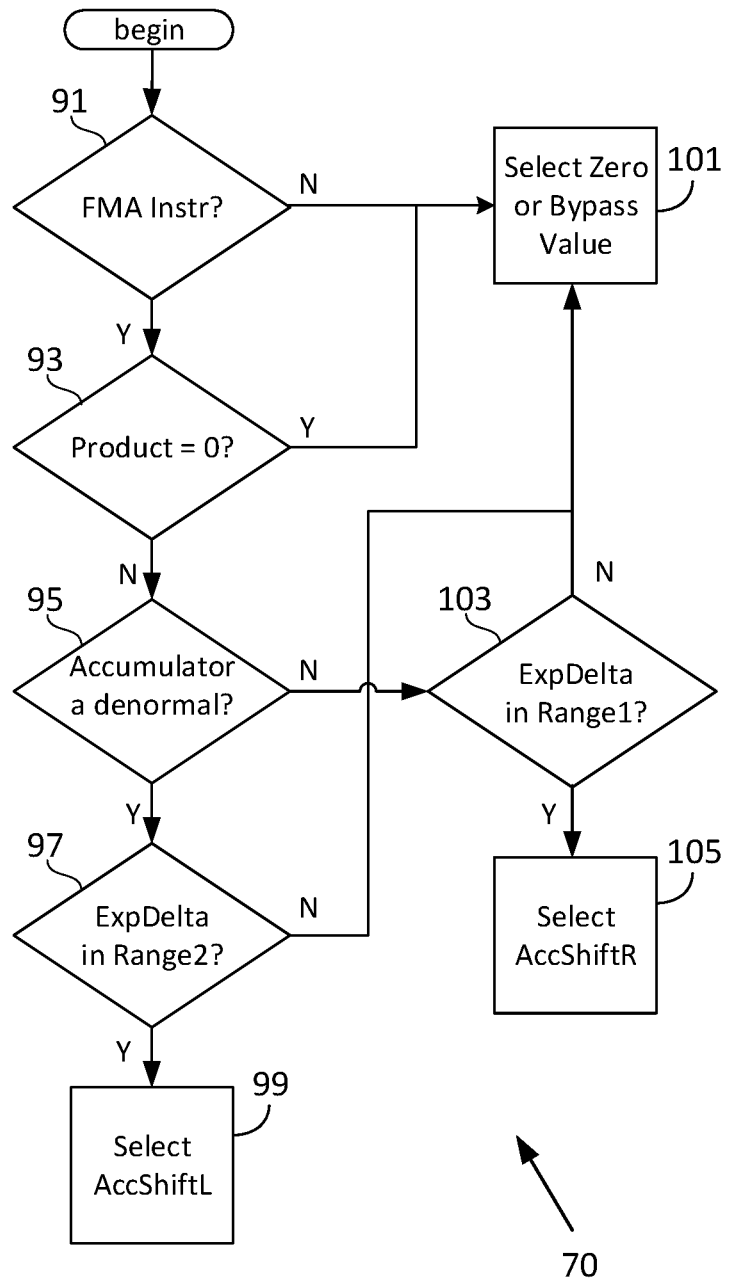
FIG. 4 is a diagram illustrating one embodiment of selection logic used to determine a value to inject into the partial product summation logic of FIG. 3.

FIG. 4 illustrates the mux select logic of the combinatorial logic 70 of FIG. 3. The particular order of evaluation illustrated is exemplary and non-critical. In block 91, the combinatorial logic 70 evaluates or receives a signal of whether the instruction being executed is an FMA instruction or some other instruction, such as a standard floating point multiply. If it is standard floating point multiply, flow proceeds to block 101. If it is an FMA instruction, flow proceeds to block 93. In block 93, if the product of the multiplier A and multiplicand B is zero (as indicated, for example, by precalculated operand tag bits), then flow also proceeds to block 101. If the product is non-zero, then flow proceeds to block 95. In block 95, the combinatorial logic 70 evaluates or receives a signal of whether the accumulator C is a denormal. If it is a denormal, then flow proceeds to block 97. If it is not a denormal, then flow proceeds to block 103. In block 103, the logic 70 evaluates whether ExpDelta is in the accumulate-in-the-first-stage (i.e., modified multiplier) ExpDelta/EffSub numberspace described in FIG. 2 of the '817 application. If so, then flow proceeds to block 105. If not, then flow proceeds to block 101. In block 97, the combinatorial logic evaluates or receives a signal of whether ExpDelta is within the range defined by AccShiftLMax. If so, then flow proceeds to block 99. If not, then flow proceeds to block 101.

If any of the foregoing determinations cause flow to proceed to block 101, then in block 101, the logic 70 selects zero or a bypass value to inject into the PPA 92.

If any of the foregoing determinations cause flow to proceed to block 99, then in block 99, the logic 70 selects the left-shifted value of C to inject into the PPA 92.

If any of the foregoing determinations cause flow to proceed to block 105, then in block 105, the logic 70 selects the right-shifted value of C to inject into the PPA 92.

Figure 5:
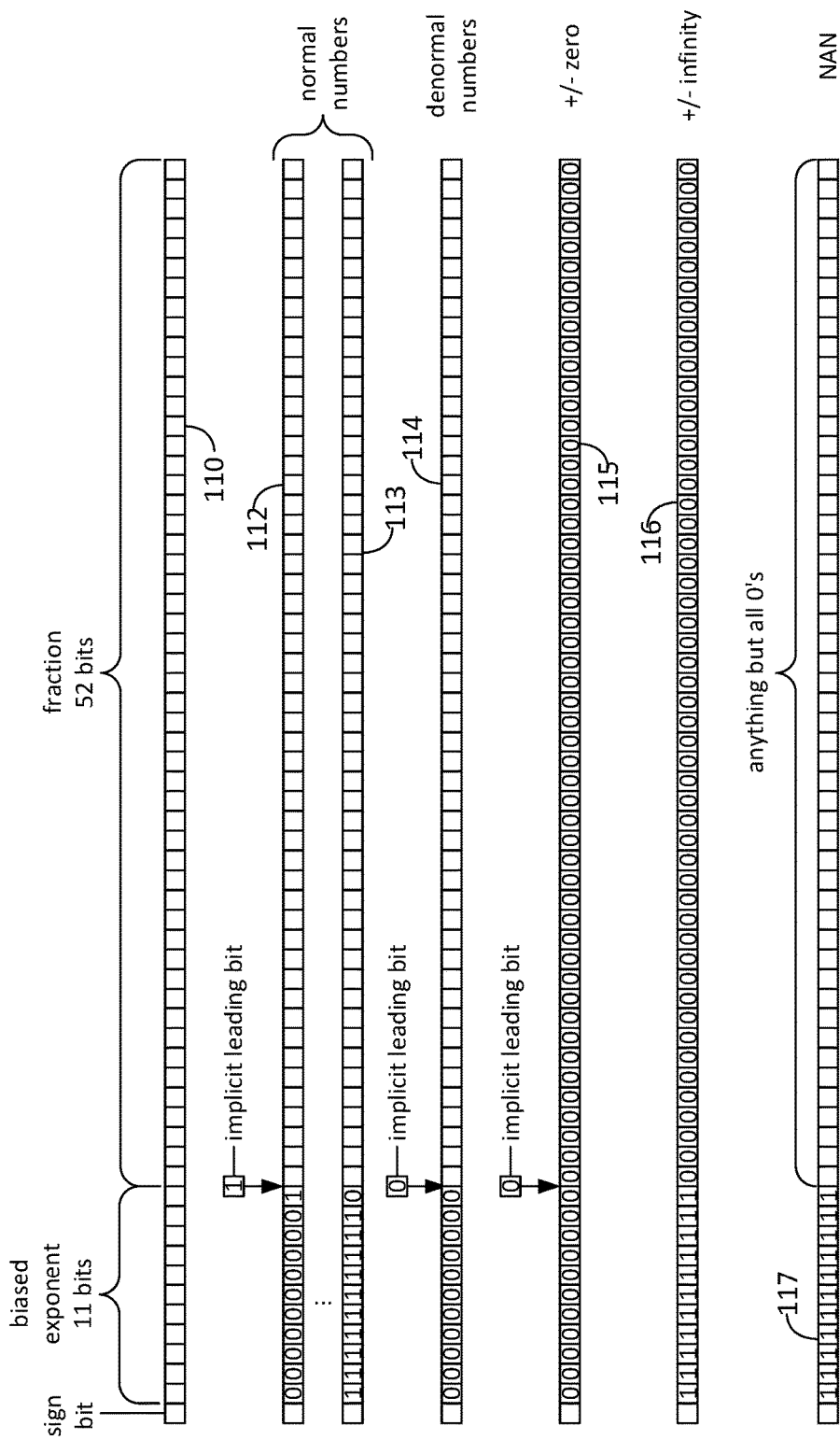
FIG. 5 is a diagram illustrating 64-bit IEEE FMA number types for double precision.

FIG. 5 illustrates the 64-bit IEEE FMA number types for double precision encoding. The bit diagrams illustrated therein are useful in conceptualizing some of the constraints involved in processing denormal numbers and the circumstances under which numbers might be accumulated within the partial product datapath 92. The top row 110 of the diagram illustrates the sign, exponent, and fraction bit fields. The second and third rows 112 and 113 illustrate the range of exponent values (1 to max−1) associated with a normal number. The fourth row 114 illustrates how a 0 value for an exponent is used to represent a denormal number. The fifth row 115 illustrates how a denormal-like number is used to represent plus and minus zero. The last two rows 116 and 117 illustrate how the maximum exponent value is reserved for representing plus and minus infinity and not-a-number (NAN) values.

From FIG. 5 it can be seen, for example, that the smallest denormal number—represented as all 0s in the fraction except for a single 1 bit in the LSB position—is $2^{-52}$ times the size of the smallest representable normal number. Such a number could be accumulated in the PPA datapath 92 with the partial product of an underflow product as small as $2^{-1076}$. The range of denormal accumulator values that can be accumulated in the PPA 32 is reduced with increasing magnitudes of denormal accumulators.

FIG. 5 provides background to a note on the manner in which the FMA logic 8 handles the IEEE 754 characterization of denormal operands. When the FMA logic 8 receives an operand, the operand is characterized by examining the exponent and mantissa bits. If the exponent bits are all zero and the mantissa bits are non-zero, the operand is identified as a denormal input value, as illustrated by line 114 of FIG. 5. Even though all of the exponent bits are zero, the exponent of a denormal number is implicitly the same as the minimum representable exponent for a normal number. In the case of a double precision floating point number, the minimum representable exponent is −1022 (represented using a 1 in the exponent field for normal numbers, or a 0 in the exponent field for denormal numbers). Even though denormals share the minimal representable exponent of a normalized number, all denormals are smaller than the smallest representable normalized number, because all normals have an implicit MSB of 1, whereas the corresponding implicit bit of a normal number would be 0.

Accordingly, when a IEEE operand is received into a datapath of the FMA logic 8, a few accommodations are performed. For one thing, an explicit bit is provided to represent the IEEE implicit bit. Also, consistent with the discussion above, the implicit bit is represented using a 1 with normal numbers and as a 0 with denormal numbers. Furthermore, in response to the denormal input value, the LSB of the exponent field can be corrected—i.e., set to a 1—and the implied bit is left as a 0. This ensures that denormal numbers are properly aligned with normal numbers.

When a denormal accumulator is received from memory into the FMA logic 8, but there are not enough leading zeroes to left shift the accumulator to cause it to be aligned with the partial product, then accumulation is delayed to the second stage 40 (e.g., a modified adder) of the FMA logic 8. The second stage 40 receives not only the underflow product but also the exponent-corrected denormal accumulator.

This leaves the second stage 40 with a simpler job than it would otherwise have to do. The second stage 40 examines the input exponent values. The greater one corresponds to the accumulator. The smaller one corresponds to the underflow product value. This causes the second stage 8 to right-shift the underflow product value. The calculation proceeds in the far path of the modified adder. The result of this calculation may be a denormal. However, if the calculation is an effective add, the calculation may cause a normal number to be produced. In either case, the rounder of the far path simply rounds to the usual LSB associated with the data size. For some instruction set architectures (ISAs), such as SSE and AVX, the calculation is now complete, regardless of whether an underflow result produces an exception or not. For other ISAs, such as the original x87 ISA, the second stage 40 would be adapted to meet peculiar requirements, such as in the case of the x87 ISA, the requirement that, if the underflow exception is not masked, the sum be normalized prior to rounding and final exponent adjustment.

FIG. 6 illustrates a subset of input operands for which accumulation of operand C is done in the PPA 32. The first row shows an ExpDelta number line. The first column shows a qualifier value ranging from 0 to 52. The qualifier value is determined by the sum of the number of bits left of the MSB bit column provided by the PPA datapath for carry and other purposes, plus one if the FMA calculation is an effective subtraction, plus the number of leading zeroes in the denormal accumulator operand, if the accumulator C is a denormal.

Although the present invention and its objects, features, and advantages have been described in detail, other embodiments are encompassed by the invention as well. For example, it is applicable to other encodings of floating point, including decimal and hexadecimal, rather than just traditional binary IEEE 754.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, a microprocessor, a central processing unit, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be electronic (e.g., read only memory, flash read only memory, electrically programmable read only memory), random access memory magnetic (e.g., a floppy disk or a hard drive) or optical (e.g., a compact disk read only memory, or "CD ROM"), and may be read only or random access. Similarly, the transmission medium may be metal traces, twisted wire pairs, coaxial cable, optical fiber, or some other suitable transmission medium known to the art. The invention is not limited by these aspects of any given implementation.

The particular embodiments disclosed above are illustrative only, and those skilled in the art will appreciate that they can readily use the disclosed conception and specific embodiments as a basis for designing or modifying other structures for carrying out the same purposes of the present invention, and that various changes, substitutions and alterations can be made herein without departing from the scope of the invention as set forth by the appended claims.

What is claimed is:

1. A method in a microprocessor of executing an FMA instruction having multiplier, multiplicand, and accumulator operands, each having a significand and an exponent, and for handling a special case in which the accumulator operand is denormal and a product of the multiplier and multiplicand operands would result in an underflow, the method comprising:
   determining an exponent difference between a sum of the multiplier and multiplicand operand exponents and the accumulator operand exponent;
   determining a number of leading zeroes in the denormal accumulator operand significand;
   when the number of leading zeroes plus a nonnegative integer constant exceeds the exponent difference, left-shifting the accumulator operand significand to produce a left-shifted accumulator value and accumulating the left-shifted accumulator value to partial products of the multiplier and multiplicand operand significands in a partial product adder;
   using a first circuit that employs 2's complement subtraction to generate a first exponent difference value that is a difference between the product of the multiplier and multiplicand exponents and the accumulator exponent and using the first exponent difference value to control a right-shifter that right shifts the accumulator operand significand;
   using a second circuit that employs 1's complement subtraction to generate a second exponent difference value that is a difference between the product of the multiplier and multiplicand exponents and the accumulator exponent and using the second exponent difference value to control a left-shifter that left shifts the accumulator operand significand; and
   if a first condition is met, selecting the right-shifted accumulator operand significand to accumulate with the partial products; and
   if a second condition is met, selecting the left-shifted accumulator operand significand to accumulate with the partial products.

2. The method of claim 1, wherein the accumulator operand significand is shifted by an amount equal to an absolute value of said exponent difference to produce the left-shifted accumulator value.

3. The method of claim 1, wherein the nonnegative integer constant is a value that is related to a width of a datapath used to sum partial products of the significands of the multiplier and multiplicand operands.

4. The method of claim 3, wherein the nonnegative integer constant is equal to the width of the datapath minus two times a width of the significand of the multiplicand operand.

5. The method of claim 1, further comprising:
   provisionally right-shifting a copy of the accumulator operand significand to generate a right-shifted accumulator value; and
   providing both the right-shifted and left-shifted accumulator values to a selection circuit;
   selecting one of the right-shifted and left-shifted accumulator values or zero to accumulate together with the partial products of the multiplier and multiplicand operand significands.

6. The method of claim 5, wherein the provisional right-shifting shifts the copy of the accumulator operand significand by an amount equal to said exponent difference.

7. The method of claim 5, wherein the selecting one of a right-shifted and left-shifted accumulator values or zero is done as a function of the relative absolute size of the accumulator operand compared to the relative absolute size of a product of the multiplier and multiplicand operands, wherein if the absolute value of the accumulator operand is more than a constant number X greater than the absolute value of the product, then zero is selected and no accumulation of the accumulator operand is done with the partial products in the partial product adder, wherein X is a function of a number of bits provided in a datapath of the partial product adder.

8. A microprocessor comprising:
   FMA execution logic configured to execute a floating point multiply-accumulate instruction of the form $\pm A*B\pm C$, wherein A, B, and C are input multiplier, multiplicand, and accumulator operands, respectively, each having a significand and an exponent;
   the FMA execution logic including a partial product adder for adding partial products of A and B;
   the partial product adder being configured to accumulate C with the partial products of A and B for a subset of input operand values in which the absolute value of C is smaller than or nearly as small as the absolute value of the product of A and B;
   wherein the FMA execution logic is configured to handle a special case in which C is denormal by:
   determining an exponent difference between a sum of the A and B exponents and the C exponent;
   determining a number of leading zeroes in the denormal C;
   when the number of leading zeroes plus a nonnegative integer constant exceeds the exponent difference, then left-shifting C to produce a left-shifted C value that is then accumulated to the partial products of A and B within the partial product adder;

a left shifter configured to left-shift C and a right shifter configured to right-shift C;

a 1's complement subtractor configured to subtract the C exponent from the product exponent, wherein the product exponent is the sum of the A and B exponents, in order to generate a first representation of the exponent difference;

a 2's complement subtractor configured to subtract the C exponent from the product exponent, wherein the product exponent is the sum of the A and B exponents, in order to generate a second representation of the exponent difference, and to feed said second representation to the right shifter; and an inverter configured to receive at least a portion of the first representation of the exponent difference generated by the 1's complement subtractor, invert it, and feed the inverted result to the left shifter;

the FMA execution logic being configured to select amongst a group of inputs to accumulate with the partial products of A and B, wherein the group of inputs comprises outputs of the left and right shifters.

9. The microprocessor of claim 8, wherein the nonnegative integer constant is equal to the width of the datapath minus two times a width of the significand of the multiplicand operand.

10. The microprocessor of claim 8, wherein:
the FMA execution logic is configured to select amongst a group of inputs to accumulate with the partial products of A and B, the group of inputs including a shifted value of C and zero;
the FMA execution logic is configured to select amongst the group of inputs as a function of a comparison of the exponent of C with the sum of the exponents of A and B.

11. The microprocessor of claim 10, wherein the FMA execution logic is configured to select amongst the group of inputs also as a function of a number of leading zeroes in C when C is a denormal.

* * * * *